United States Patent [19]

Noll

[11] 3,919,691

[45] Nov. 11, 1975

[54] TACTILE MAN-MACHINE COMMUNICATION SYSTEM

[75] Inventor: A. Michael Noll, Passaic Township, Morris County, N.J.

[73] Assignee: Bell Telephone Laboratories, Incorporated, Murray Hill

[22] Filed: May 26, 1971

[21] Appl. No.: 147,052

[52] U.S. Cl. .......................... 340/172.5; 340/324 A

[51] Int. Cl.² .......................................... G06F 3/02

[58] Field of Search ............ 340/172.5, 324, 324 A; 250/231; 235/151; 444/1; 445/1

[56] References Cited

UNITED STATES PATENTS

| | | | |
|---|---|---|---|
| 3,022,878 | 2/1962 | Seibel et al. | 340/172.5 |
| 3,166,856 | 1/1965 | Uttal | 340/172.5 |
| 3,241,562 | 3/1966 | Gronier | 235/151 X |
| 3,346,853 | 10/1967 | Koster et al. | 340/172.5 |
| 3,422,537 | 1/1969 | Dewey et al. | 235/151 X |
| 3,534,396 | 10/1970 | Hart et al. | 340/172.5 X |
| 3,559,179 | 1/1971 | Rhoades | 340/172.5 |
| 3,601,590 | 8/1971 | Norton | 235/151 |
| 3,602,702 | 8/1971 | Warnock | 235/151 |
| 3,621,214 | 11/1971 | Romney et al. | 340/172.5 |
| 3,665,408 | 5/1972 | Erdahl et al. | 340/172.5 |

*Primary Examiner*—Gareth D. Shaw
*Assistant Examiner*—John P. Vandenburg
*Attorney, Agent, or Firm*—G. E. Murphy; A E Hirsch; H L Logan

[57] ABSTRACT

Operation of a computer system is enhanced by means of a three-dimensional tactile control unit interactively coupled by a software package to the computer. By means of a sticklike mechanism, which is mechanically controlled by a servomotor system and energized by computer-generated signals proportional to a stored definition of a three-dimensional object, the hand of an operator is restrained to move over the surface of the object. Hence, surfaces of a three-dimensional object, otherwise virtually impossible to display, may be "felt" by the operator.

10 Claims, 6 Drawing Figures

INVENTOR
A. M. NOLL
BY
G. E. Hirsch Jr.

TACTILE MAN-MACHINE COMMUNICATION SYSTEM

This invention pertains to an interactive man-communication system, and more particularly to an interactive system which enables an individual physically to perceive the surface configuration of a three-dimensional object specified in the memory of a computer.

BACKGROUND OF THE INVENTION

Although modern computers can process and generate data at a tremendous rate, the presentation of output data in the form of long columns of tabulated numerical information is difficult for a human to comprehend and to utilize effectively. Accordingly, graphic display devices have been developed to enable an operator to grasp visually large amounts of data developed by a computer. With such graphic terminal units, the user may present his statement of a problem to the machine in a convenient and rapid fashion and get his results quickly in a visual form that may be used by him directly.

One of the simplest forms of graphic units is the automatic plotter controlled directly by a computer. In its simplest form, the plotter consists of an ink pen that is moved from one point to another on a sheet of paper to develop an image. The required electrical signals for positioning the pen are obtained from the output of the computer. A similar display may be developed on the face of a cathode ray tube. Light pens or the like are available to permit changes or additions to be made to the cathode ray display. In addition to preparing two-dimensional displays, the computer and an automatic plotter can calculate and draw two-dimensional perspective projections of any three-dimensional data. However, for many applications, particularly those involving very complicated plots with many hidden portions, a simple perspective plot is unsatisfactory. For these occasions, true three-dimensional plots are made by drawing separate pictures for the left and right eyes. When viewed stereoscopically, the pictures fuse and produce a three-dimensional effect. With such graphical displays and associated equipment, an operator can interact and communicate graphically with the computer and almost immediately see the results of his efforts.

Yet, if a three-dimensional interactive computer-graphics facility is to be of any real use, the user must be able to communicate in three dimensions with the computer. This means that a system which allows effective and efficient input of three-dimensional data must be available. Although joy stick arrangements or the like are available for this purpose, it is still difficult for an operator to comprehend a visual display of a three-dimensional object on the basis of a mere stereo representation or perspective depiction of it. As an example, a designer working with a three-dimensional object has a need to know about the interior contours of the surface of the object, i.e., those normally blocked from view in a front projection of the object. Preferably, the designer needs to be able to mold shapes or forms using his hands and the sensation of touch. In fact, it would be desirable if he were able to "feel" an object even though it exists only in the memory of the computer. Obviously, the graphic displays available to the operator, whether using perspective views or stereoscopic presentations, fail to meet this need.

SUMMARY OF THE INVENTION

Experience gained in using interactive stereoscopic facilities indicates that many users have extreme difficulty in "latching" onto a line or a dot when using a three-dimensional input device. The only assistance for performing this task is the stereoscopic display together with the operator's depth perspective abilities. These abilities are augmented, in accordance with this invention, by introducing controlled force-responsive units into a three-dimensional tactile terminal unit so that, in effect, a computer may alter or vary the feel of the terminal unit to the user. The terminal unit may even be locked in certain positions through simple force feedback.

Accordingly, a tactile terminal unit, in accordance with the invention, assists an operator by augmenting the visual communication channel between the operator and a computer.

The system of this invention employs a three-dimensional terminal unit that enables an operator to specify the location of a point in three-dimensional space in terms of its cartesian coordinates. In its simplest form, the terminal unit utilizes a three-dimensional control mechanism, such as a movable arm or control stick, for generating data representative of the three-dimensional position indicated by the arm. These data are supplied to a computer and used both to indicate the position of the point in space and also, if desired, to develop data for a stereoscopic visual display. In return, the computer develops a mathematical statement of the surface configuration of the object, compares the momentary position indicated by the movable arm system with the corresponding position on the surface, and generates any necessary force components to alter the mobility of the movable arm. The user is thus able to probe, by feel, the contents of three-dimensional space. The control arm defines only a single point in space; hence, its operation is akin to poking around three-dimensional space with a stick. When the indicated probe position touches a line or surface of the object, the computer feeds back a signal to impede further motion, thus giving the operator the impression that he is actually touching or bumping the surface.

As an alternative, a terminal unit in accordance with the invention, may include a system of controlled sensors, one for each of the operator's fingers. With such an arrangement, an operator may feel an object as by grasping it as opposed to touching it with a point.

Although the system of the invention finds its most advantageous use in dealing with three-dimensional depictions of objects, it is apparent that one- or two-dimensional representations may also be accommodated. Because of the obvious advantages in the three-dimension domain, however, the examples of practice described herein are directed to that applications of the invention. With either form of terminal unit, it is evident that the operator, the terminal unit, and the computer system may be coupled to a distant station so that two or more operators may simultaneously add to or modify the shape of the depicted object and thus interactively communicate with one another. Concomitantly, blind operators are able to feel the shape of graphs, curves, surfaces, and two- or three-dimensional objects.

BRIEF DESCRIPTION OF THE DRAWINGS

The invention will be fully apprehended from the following detailed description of a preferred illustrative embodiment thereof, taken in connection with the appended drawings. In the drawings.

DETAILED DESCRIPTION

Figure 1:
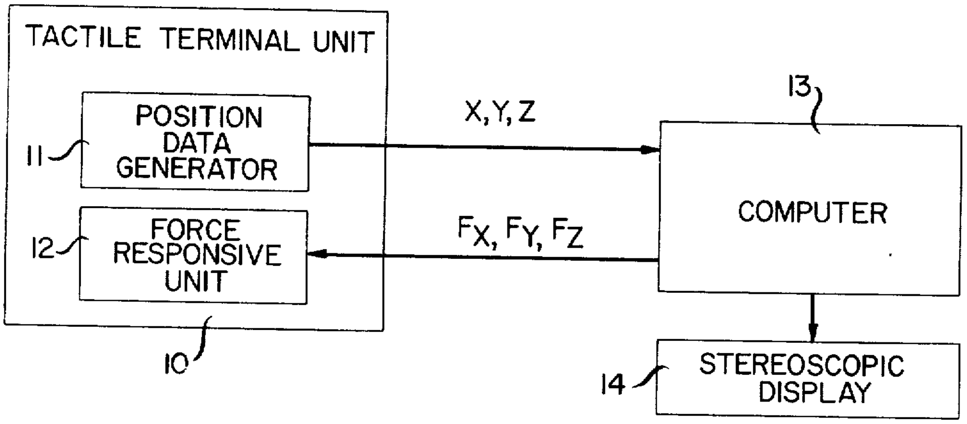
FIG. 1 is a block schematic diagram of an interactive system for enabling an individual physically to perceive the configuration of an object in accordance with the invention.

An interactive system for enabling an individual physically to perceive the shape, e.g., surface configuration, of an object in accordance with the invention is illustrated schematically in FIG. 1. In its simplest form, the system includes tactile terminal unit 10 which includes a position data generator 11 and a force responsive unit 12. Preferably, position data generator 11 includes orthogonally movable means, for example a control stick which may be moved in each of three directions, for developing voltages representative of the cartesian coordinates X, Y, and Z of a point in three-dimensional space. One suitable arrangement for tactile terminal unit 10 which includes an arrangement for developing position data is illustrated in FIG. 2.

Figure 2:
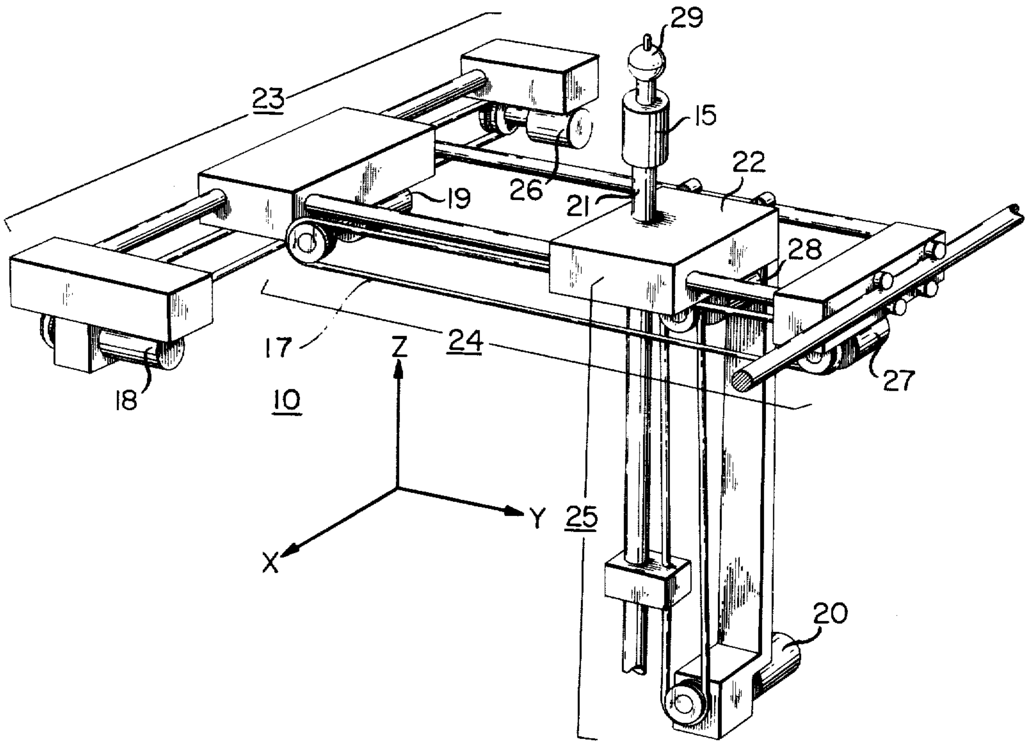
FIG. 2 is a pictorial representation of a tactile terminal unit including a suitable position data generator and a force responsive unit useful in the practice of the invention.

In the apparatus of FIG. 2, an arm or stick 21 is movably supported for motion in each of three directions, X, Y, and Z. Platform 22 is arranged to move in the X direction on gear or chain mechanism 23, and to move in the Y direction on mechanism 24. Arm 21 may be moved in the Z direction on mechanism 25. Any arrangement for permitting controlled motion in the three directions may, of course, be used. For example, rack and pinion arrangements, chain and sprocket drives, and the like, are satisfactory. In the illustration of FIG. 2 a belt-pulley arrangement is shown, wherein mechanism 24, for example, comprises platform 22 physically connected to belt 17 which, in turn, is connected via a pulley to the shaft of motor 19 and via another pulley to the shaft of potentiometer 27. When platform 22 is moved by the operator in the Y direction, belt 17 is pulled, and the shafts of motor 19 and of potentiometer 27 are made to rotate. Alternatively, if motor 19 is activated, the rotation of its pulley moves belt 17 which, in turn, rotates the pulley of potentiometer 27 and also moves platform 22 in the Y direction. In a totally analogous manner mechanism 23 operates in the X direction and mechanism 25 operates in the Z direction.

Associated with movement in each of the three directions are potentiometers 26, 27 and 28. As arm 21 is moved in any of the three directions, the associated potentiometer is adjusted proportionally. The momentary resistance values of the three potentiometers represent the position of a point on the arm in the three coordinate directions. In practice, a voltage in the range of −10 to +10 volts dc, is controlled by each potentiometer, and the three voltages are converted to a digital representation for input to the computer. A variety of three-dimensional control arrangements are known to those skilled in the art. Suffice it to say, any arrangement for developing resistances or voltages representative of a point in three dimensions is satisfactory.

Tactile terminal unit 10 (FIG. 1) also includes a force responsive unit 12. It typically includes (FIG. 2) a number of individual units, 18, 19, and 20, actuated by force signals $F_X$, $F_Y$, and $F_Z$ applied from computer 13. These units may include electrically reversible motors, or the like, each one coupled to or associated with the mechanism which controls the motion of arm 21. The motor units either assist or deter motion of arm 21.

Data from the potentiometers associated with position generator 11 are delivered to the input of computer 13 which contains the appropriate program information with which to plot the indicated position of the point indicated by arm 21 in three-dimensional space. Computer 13 may, if desired, also contain a program for generating the coordinates of a stereoscopic graphical display. The program for computer 13 may be a software program associated with a general purpose computer or a hardware program which is realized by special purpose hardware apparatus. One example of a hardware implementation of computer 13 is hereinafter described in greater detail. The data generated by computer 13 are delivered to display unit 14 and used in conventional fashion to develop a stereoscopic image. With the addition of display unit 14, an operator of terminal unit 10 may not only feel the position of a point in space as he moves the control stick under control of the computer, but he may at the same time see the point in space as indicated on the stereoscopic display of unit 14.

Computer 13 is additionally supplied with a mathematical definition of a desired object or shape, in one, two, or three dimensions. This data may be supplied by specifying a mathematical formula and by providing means for evaluating the formula, or this data may be supplied by storing in a memory all of the pertinent results. As position data generator 11 develops successive coordinate data, the information is compared in computer 13 with the supplied coordinate data for the stored surface and the difference, if any, is used to generate appropriate force signals. If the position data from the tactile unit indicates that the control stick is not at a point corresponding to one on the surface of the object, the force signals are zero and stick 21 is free to move in any direction. If the two sets of data do match, indicating a point on the surface of the object, computer 13 generates force signals which are applied to responsive unit 12 to impede or aid the movement of arm 21. Typically, computer 13 develops at its output three 8-bit digital numbers which are converted to three analog direct-current voltages in the range of −10 to +10 volts to actuate the motor units of force responsive system 12. If necessary, the voltages from the computer may be converted to alternating current form.

The operator accordingly is urged to trace the surface of the object by manipulation of stick 21. In effect, motion of stick 21 is impeded for those situations in which the user is bumping into the surface of the object. In practice it has been found that a linear force of about twelve pounds is sufficient as the required maximum force to simulate bumping into a fairly rigid object. If desired, forces of sufficient magnitude may be applied to constitute an absolute bar to further motion.

It is further in accordance with the invention to overcome any friction or inertia of the moving arm system, in order to allow it to move as freely as possible, by programming the computer to provide appropriate force signals independent of those specified by the comparison operation. An approximation to the three-dimensional velocity of the movable arm, for example, computed from the first differences of the position of the arm, and multiplied by an experimentally determined constant, is used to prescribe forces sufficient to overcome friction. Similarly, since inertia of the arm results in a force proportional to acceleration which opposes movement of the arm, a measure of acceleration, e.g., from a computation of the second difference of the three-dimensional position of the arm, or from an accelerometer, may be used to control motor forces to overcome inertia. In practice, it has been found that strain gages associated with arm 21, for example, mounted in housing 15, adequately measure the forces between the operator's hand and the arm. These measurements have been used to specify the magnitude of movement assist forces used to overcome friction and inertia of the moving tactile system. With movement assistance, however prescribed, an operator is truly free to move arm 21 in dependence only on restraining or aiding forces relative to the specified object.

As a refinement, arm 21 is provided with a ball or knob 29 by which the operator may grasp the control stick. Preferably, ball 29 is divided into two electrically insulated halves with the top half containing a microswitch which is actuated, for example by pushing a small button at the top of the ball or by a resistive contact through the hand to the lower portion of the knob. This provides a convenient on/off mechanism, i.e., a "dead man" arrangement, such that the terminal unit is actuated only when knob 29 is grasped or the button in knob 29 is actuated.

In a software implementation of computer 13, the program for controlling computer 13 inputs data developed by position data generator 11 and outputs control signals for force responsive unit 12. Since the position of the control arm is indicated by three resistance or voltage values, an input subroutine may be called three times to input the three values. The motor output portion of the program employs a subroutine which simply outputs three numbers to three digital-to-analog converters. In a hardware implementation of computer 13, as hereinafter disclosed, no programs or subroutines are necessary since the particular hardware interconnection dictates the operation of the computer.

Figure 3:
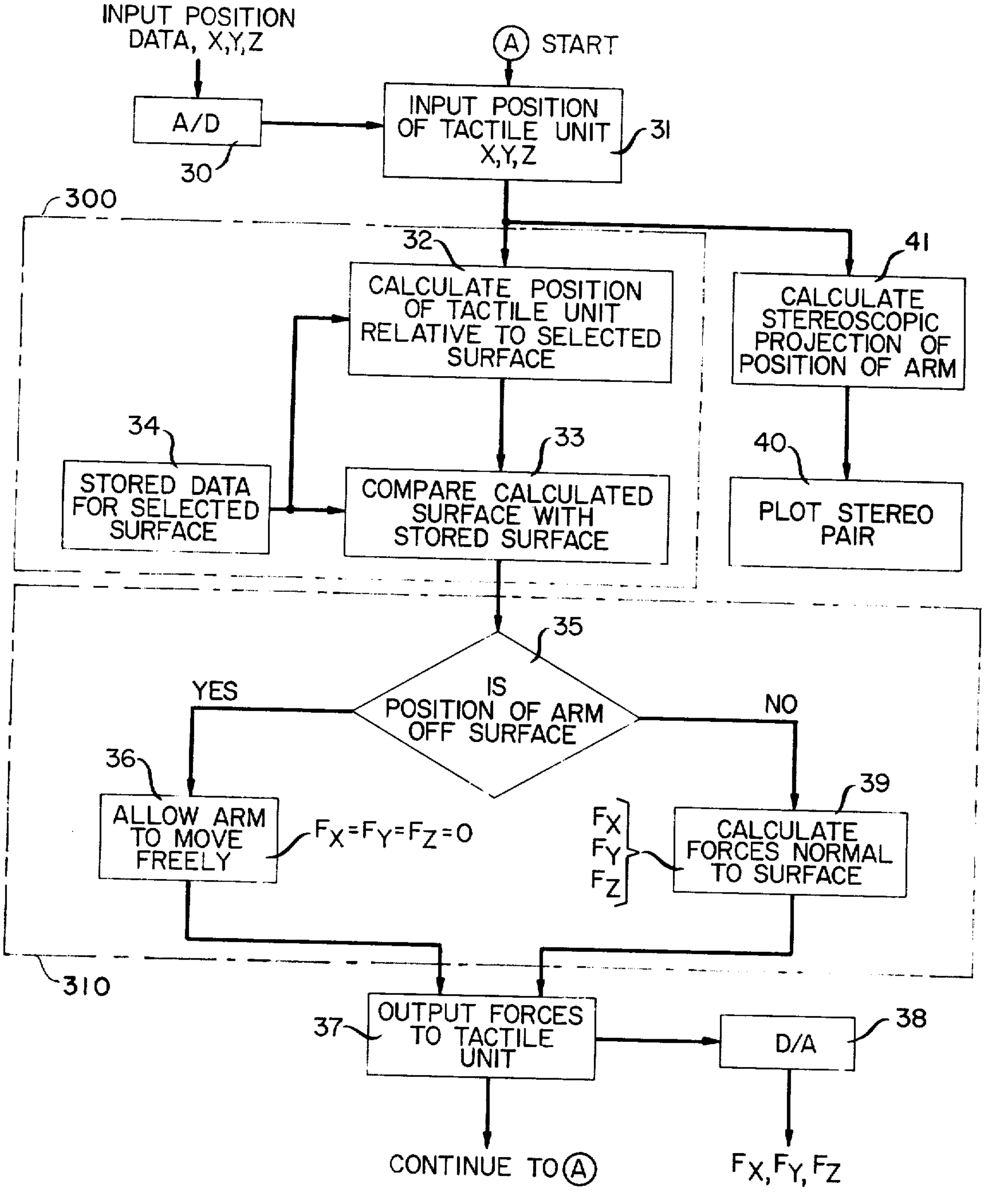
FIG. 3 is a block diagram in the form of a flow chart, which illustrates the computational operations carried out in accordance with the invention.

FIG. 3 illustrates in flow chart from the necessary computational operatons carried out in computer 13, whether in software or in hardware. All of the operations are relatively simple and may be converted into computer language by one skilled in the art without undue difficulty. Although the programs may be written in any language, it has been found convenient to use Fortran. Simple subroutines may then be employed for communication to and from the tactile unit. Input position data from tactile terminal unit 10 is converted to digital form in analog-to-digital converter 30. These data are supplied to the input position portion of the computer indicated in the flow chart by block 31. Computation begins when a start signal is supplied at A. Digital position data thereupon is brought into computer memory. These data are supplied to computational unit 32 wherein the position of arm 21, e.g., in cartesian or polar coordinates, in terms of origin shift, or the like, is calculated relative to the surface of the selected object. Data which defines the surface configuration of the selected object may be developed from actual measurements of a physical object or from a mathematical model of the object. These defining data are stored in unit 34.

The calculated point position, specified by the position of arm 21, is compared with the surface of the selected object in element 33. In essence, the coordinate distance between the point position of the arm and the surface is determined. The smaller the distance, the closer the point position is to the surface. A threshold decision is then made in decision unit 35 to determine whether the point position specified by the arm is ON or OFF of the selected surface. For computational convenience, the question "Is the position of the arm OFF of the surface?" is asked. If the position of the arm defines a point OFF of the surface, i.e., the answer to the question is "yes," force signals $F_X$, $F_Y$, and $F_Z$ equal to zero are developed in unit 36 in order that the tactile unit may be allowed to move freely. These force signals (coupled with any movement assist forces) are transferred via output unit 37 to digital-to-analog converter 38 and thence to the tactile terminal unit. As the output forces are so transferred, the program continues to A and the entire operation is repeated for the next input position suggested by tactile unit 10. If a decision is made in unit 35 that the position defined by the tactile unit is ON the surface of the object, i.e., the answer is "no," unit 39 calculates forces normal to the surface of the object. Force signals $F_X$, $F_Y$, and $F_Z$, are then delivered via output unit 37 to digital-to-analog converter 38 and the program is, as before, continued to A for the next input data. Forces F are used to restrain movement of arm 21 and indicate to the operator that he is ON the surface.

Force signals may, of course, be developed in accordance with any one of a number of control laws. For example, using well-known software techniques, linear, bang-bang control laws, or combinations of them, may be implemented. Using appropriate force rules, the tactile unit may be positioned by the computer force signals to remain at a prescribed point, or restrained so that it can be freely moved by an operator over only a prescribed three-dimensional path or surface.

Figure 4:
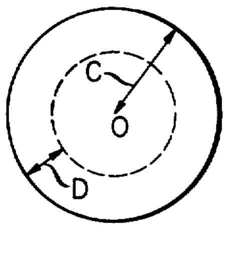
FIG. 4 is a representation of a sphere described hereinafter as an example from practice.

As an example of the way in which the tactile terminal unit and computer interact to afford an operator a feel of an object in space, consider a simple sphere of radius C. For ease of understanding, a software implementation of computer 13 is assumed for purposes of this example so that mathematical equations rather than tables of coordinates may be used in the following discussion. Consider, therefore, a sphere which is somewhat spongy or rubbery at its outer surface to a depth D from the surface. An example of such a configuration is shown in FIG. 4. The three-dimensional coordinates of the position of the tactile device under control of the position data generator 11, are inputted to computer 13 which then expresses coordinates, X, Y, and Z, relative to the center of the sphere. The radius R of the sphere is then computed from the coordinates X, Y, Z, according to the equation for a sphere, namely, $$R = [X^2 + Y^2 + Z^2]^{1/2} . \quad (1)$$

Stored data for the selected sphere is entered into element 34 of the computer according to the standard equation for a sphere of radius C. It is then necessary to determine whether the momentary position of the tactile indication is ON, OFF, or within the configuration of the sphere. Thus, a decision is made to determine if R is greater than C. If the radius R is greater than or equal to a specified radius C of the sphere, as determined in decision circuit 35, no force signals are developed and force response unit 12 receives no controlling information. The tactile device may thereupon be moved freely by the operator to find the surface of the sphere. In this case, $$F_X = F_Y = F_Z = 0 . \quad (2)$$

Figure 5:
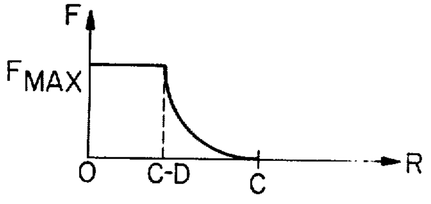
FIG. 5 is force diagram helpful in describing the operation of the tactile terminal unit of the invention and, FIG. 6 is an illustration of a suitable computer 13 useful in the block diagram of FIG. 1.

If the calculated radius R is less than the radius C of the stored sphere, decision circuit 35 indicates "no." Forces for the three motors in force responsive unit 12 are thereupon computed such that the resultant force F normal to the surface of the sphere is proportional to the square of the radial distance within the sphere indicated by the terminal unit. The force is thus altered according to a specified force law to accommodate the sponginess of the sphere for the depth D into the sphere. One suitable force law is a square law as shown schematically in FIG. 5. Thus, no force signals are developed until the indicated position of the tactile device reaches the surface of the sphere at radius R=C. Force, according to a square law, is then developed within the region D to point C-D, at which time maximum allowed force $F_{MAX}$ is generated. Maximum force $F_{MAX}$ is continued even though the control arm is moved beyond C+D toward the center, zero, of the sphere. Expressed mathematically, $$F = F_{MAX} \text{ if } R \leq C - D$$

$$= \frac{F_{MAX}}{D^2} [R - C]^2 \quad (3)$$

Using these relationships, the components of a normal force suitable for restraining the tactile device are developed as follows:

$$F_X = \frac{X}{R} \cdot F$$
$$F_Y = \frac{Y}{R} \cdot F \quad (4)$$
$$F_Z = \frac{Z}{R} \cdot F$$

Values of $F_X$, $F_Y$, $F_Z$ are forwarded to force response unit 12 to provide the necessary impeding force to guide the operator over the surface of the sphere. It is evident that the sponginess of the surface in segment D may be varied by varying the force component calculated for that region or by altering the force law employed.

Other shapes are similarly treated by storing a mathematical statement of the surface configuration, and by comparing the momentary position indicated by position data generator 11 to the corresponding point on the surface and finally by developing any necessary forces to guide control arm 21 in the hands of the operator.

Figure 6:
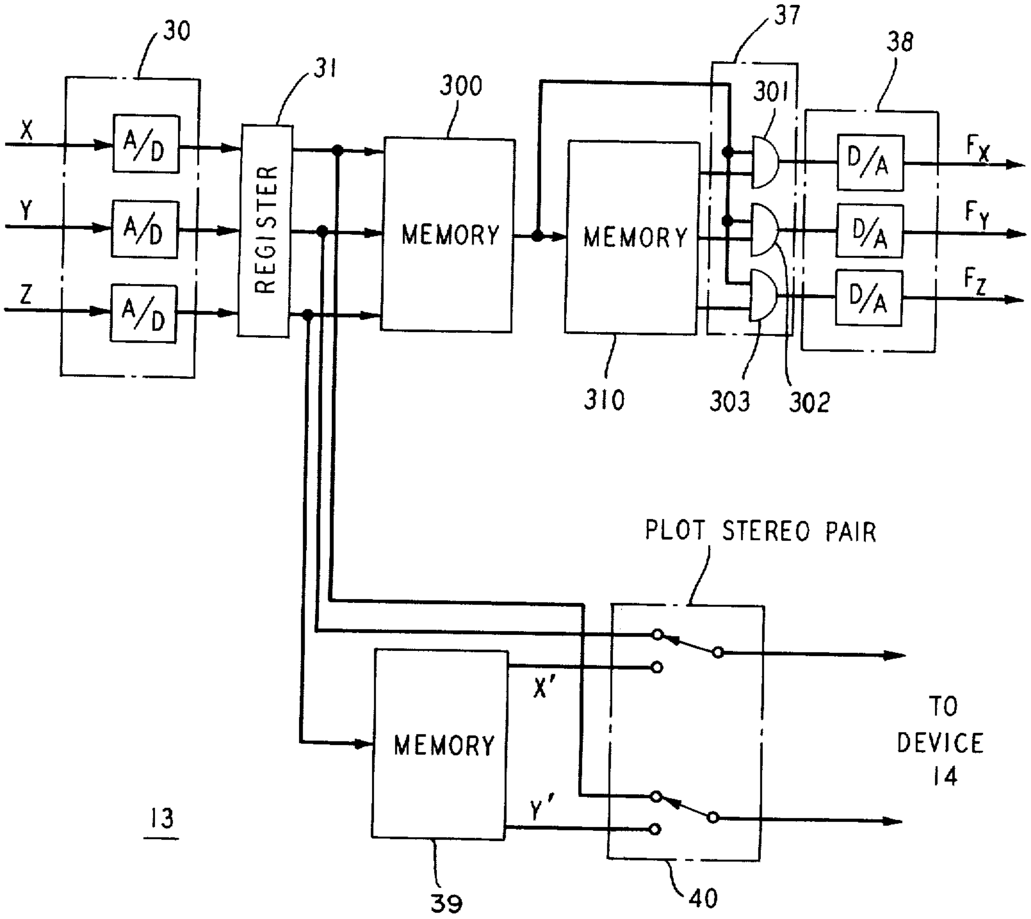

FIG. 6 illustrates a conventional embodiment of computer 13 shown in FIG. 1. Analog signals X, Y, and Z are applied by potentiometers 26, 27, and 28, of FIG. 2, respectively. These signals are converted to digital form in block 30 which comprises three A/D converters. The three digital numbers at the output of block 30 are catenated and placed in address register 31. In this embodiment, the mere catenation of the digital numbers comprises the step of computation of the input position of the tactile unit. This is also depicted by block 31 in FIG. 3. Memory 300, which may be any read-write memory of conventional nature, contains the information regarding the shape of the particular "object" that the operator must "feel." This information is placed in memory 300 a priori. Since each set of X, Y, and Z coordinates specifying the position of arm 21 of FIG. 2 corresponds to a different memory address, each such address need only contain a few bits of information - the arm position with respect to the "objects" surface in the most significant bit (0 off surfaces, 1 otherwise), and a preselected value of desired force when the arm is beyond and within the "objects" surface, in subsequent bits. In accordance with this embodiment, memory 300 serves the function of blocks 32, 33, and 34 in FIG. 3.

Memory 310 computes the force signal necessary to apply to motors 18, 19, and 20. This is simply done by storing in memory 310, which may be any standard read-write memory, the desired force signal information as a function of arm position relative to the "object's" surface. In accordance with this invention, when arm 21 is off the "object's" surface, no force is exerted by motors 18, 19, and 20. Accordingly, the most significant bit of memory 300 output signal, which is at logic level 0 when arm 21 is off the "object's" surface is used to inhibit the output signal of memory 310 with AND gates 301, 302, and 303. Memory 310 serves the same function as blocks 35, 36, 37, and 39 in FIG. 3.

Block 38 converts the digital signals emanating out of memory 310 and generates corresponding analog signals at $F_X$, $F_Y$, and $F_Z$.

To generate the stereoscopic display, computer 13 must generate a set of signals for the two dimensional display screen which, when properly viewed, gives a three dimensional effect to the display. This is accomplished by memory 39 and multiplexer 40. For each depth indication of the Z signal, provided by arm 21 of FIG. 2, memory 39 provides the prestored horizontal and vertical shift necessary to give the effect of such a depth. Accordingly, in response to the Z coordinate signal memory 39 provides signals X' and Y' indicative of the X and Y location of the stereo image. Multiplexer 40 alternatively applies the true image signal X, Y and the stereo image signal X', Y' to commercially available stereoscopic display unit 14 which, in turn, displays the stereo image.

The apparatus of FIG. 6 requires no programming whatsoever. The memories depicted in FIG. 6 are read-only-memories which are responsive only to their address signals. The only specification necessary is a specification of the memory contents - and that is a straightforward, though possibly a tedious, task.

By way of an example, memory 300 may be specified as follows. First, the cube of space within which knob 29 can be maneuvered is subdivided with a three dimensional grid system. Each intersection of the grids, identified by the $x$, $y$, and $z$ coordinates, specifies a point in space within the cube. For example, if each dimension of the cube is subdivided by eight grids, coordinates $x = 000_2$ (binary zero), $y = 000_2$, and $z = 000_2$, defining a memory address add=000000000 (via concatenation of the three coordinates), correspond to the lower-left-back corner of the cube. Similarly, coordinates $x = 100_2$ (binary 4), $y = 100_2$, and $z = 100_2$, defining an address add=100100100, correspond to the center of the cube.

In memory 300, an object is specified by associating a 0 with each point in space outside the solid, and by associating a 1 with each point in space within the solid. If, for example, a solid cube of length $100_2$ to a side is desired to be specified, and if the cube is placed with its lower-left-back corner located at coordinate $x = 000_2$, $y = 010_2$, and $z = 011_2$, the memory 300 would contain a 1 in all memory addresses shown in Table 1 and a 0 in all remaining memory addresses.

TABLE 1

| Address | Address | Address | Address |
|---|---|---|---|
| x y z | x y z | x y z | x y z |
| 000010011 | 001010011 | 010010011 | 011010011 |
| 000010100 | 001010100 | 010010100 | 011010100 |
| 000010101 | 001010101 | 010010101 | 011010101 |
| 000010110 | 001010110 | 010010110 | 011010110 |
| 000011011 | 001011011 | 010011011 | 011011011 |
| 000011100 | 001011100 | 010011100 | 011011100 |
| 000011101 | 001011101 | 010011101 | 011011101 |
| 000011110 | 001011110 | 010011110 | 011011110 |
| 000100011 | 001100011 | 010100011 | 011100011 |
| 000100100 | 001100100 | 010100100 | 011100100 |
| 000100101 | 001100101 | 010100101 | 011100101 |
| 000100110 | 001100110 | 010100110 | 011100110 |
| 000101011 | 001101011 | 010101011 | 011101011 |
| 000101100 | 001101100 | 010101100 | 011101100 |
| 000101101 | 001101101 | 010101101 | 011101101 |
| 000100110 | 001101110 | 010101110 | 011101110 |

Memory 310 of FIG. 6 is specified in a manner similar to the manner of specifying memory 300. However, instead of the 1 and 0 contents of memory 300, memory 310 contains force information $F_x$, $F_y$, and $F_z$ in three concatenated fields. For example, a memory word

1 0101 0 0100 0 000 in memory 310 contains a first field 10101 which receives to movement in the $x$ direction, a second field 00100 which relates to movement in the $y$ direction, and a third field 0000 which relates to movement in the z direction. Each field is subdivided into two subfields, indicating direction and magnitude. In the above example, the first field indicates a direction 1 (e.g., to the left) and a magnitude $\mathbf{0101_2}$; the second field indicates a direction 0 (e.g., upwards) and a magnitude $\mathbf{0100_2}$; and the third field indicates a direction 0 (e.g., forward) and a magnitude $\mathbf{0000_2}$ (no force at all).

Memory 39 of FIG. 6 is also specified in a manner similar to the specification of memory 300, except that instead of the 1 and 0 contents of memory 300, memory 39 contains location shift information for the stereo display. For example, some memory locations will have a contents equal to their $x$ and $y$ coordinates, e.g., add =011101110, contents=011101, corresponding to no shift at all (front face of the cube), while some memory locations will have a contents that is different but related to the address, e.g., add =010100011, contents = 100110 (a shift to the right and upwards of the back face of the cube).

By means of the system of the invention an operator can thus feel and identify shapes and objects that exist only in the memory of a computer, using a conceptually simple tactile terminal arrangement. The system therefore aids and augments conventional man-machine communication. It also enhances man-to-man communication using a computer as the intermediary. For this application, two humans, each located at a physically separate location, and each with a tactile terminal unit, are linked together by a communications network. The operator at one location may then feel, via his tactile unit, the shape of an object prescribed by the operator at the other location. For example, a purchaser of cloth in New York City may feel the texture of cloth offered by a seller in Chicago. A man-to-man communication facility would, of course, be augmented by and coupled with facilities for the transmission of sound and images, thus greatly to expand the scope of the communications link.

What is claimed is:

1. A tactile terminal for a graphic computer system, which comprises, in combination, a data generator for delivering to a computer coordinate signals in a three-dimensional coordinate system which define the position of a point in space, means for comparing the position defined by said coordinate signals to the position of a prescribed point within said three-dimensional coordinate system stored within said computer to produce signals related to any difference therebetween, and responsive means supplied with said related signals from said computer to control said data generator to produce coordinate signals which correspond substartially to said prescribed point.

2. A tactile terminal, as defined in claim 1, wherein, said data generator comprises, an orthogonally movable arm, and signal generator means operatively associated with said arm for developing signals representative respectively of the position of said arm in each of said three coordinate directions.

3. A tactile terminal, as defined in claim 1, wherein, said responsive means for controlling said data generator comprises, means associated with said arm for controlling its motion in each of said coordinate directions in response to said related signals.

4. A tactile terminal, as defined in claim 1, in further combination with, means associated with said computer and responsive to said coordinate signals and to data stored within said computer for generating the coordinates of a stereoscopic display of an object, the surface of which contains said prescribed point, and the said point in space, and means responsive to said stereoscopic coordinates for displaying a stereoscopic image.

5. A system for enabling an individual physically to perceive the surface configuration of a multidimensional object, which comprises, adjustable means for developing voltages representative of the coordinates of a point in space, means for selectively controlling the mobility of said adjustable means, means supplied with reference coordinate data representative of the surface contour of a multidimensional object, means for determining any difference between the coordinate position represented by said voltages and a corresponding reference coordinate position, and means responsive to a difference for controlling the mobility of said adjustable means.

6. A system as defined in claim 5, wherein, said adjustable means comprises three signal generators individually controlled by an orthogonally movable element.

7. A system as defined in claim 5, wherein said means for selectively controlling the mobility of said adjustable means comprises, three force producing elements mechanically coupled to said adjustable means.

8. An interactive system for enabling an individual physically to perceive the surface configuration of a three-dimensional object, which comprises, orthogonally movable means for developing voltages representative of the coordinates of a point in a three-dimensional coordinate system, means for selectively controlling the mobility of said movable means, means supplied with reference coordinate data representative of the surface contour of a three-dimensional object, means for determining any difference between the coordinate position represented by said voltages and a corresponding reference coordinate position, means responsive both to a difference and to a prescribed control law for developing mobility control signals, and means responsive to said mobility control signals for actuating said mobility control means.

9. An interactive system as defined in claim 8, wherein, said prescribed control law is selected to restrain the mobility of said orthogonally movable means in prescribed directions.

10. A tactile communication system, which comprises, first orthogonally movable means at a first location for developing voltages representative of the coordinates of a point in space, means for selectively controlling the mobility of said first movable means, second orthogonally movable means at a second location for developing voltages representative of the coordinates of a point in space, means for determining any difference between the coordinate position represented by said voltages developed by said first movable means and the coordinate position represented by said voltages developed by said second movable means, and means responsive to a difference for actuating said mobility controlling means.

* * * * *